(12) United States Patent
Yamamoto

(10) Patent No.: US 6,933,039 B2
(45) Date of Patent: Aug. 23, 2005

(54) OPTICAL COMPONENT

(75) Inventor: Hiroyuki Yamamoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/142,451

(22) Filed: May 10, 2002

(65) Prior Publication Data

US 2003/0082383 A1 May 1, 2003

(30) Foreign Application Priority Data

May 11, 2001 (JP) ........................................ 2001-142095

(51) Int. Cl.⁷ ............................ G02B 5/04; G02B 5/08; G02B 7/18
(52) U.S. Cl. .................... 428/195; 428/411.1; 359/488; 359/496; 359/500; 359/831; 359/871
(58) Field of Search ................................ 359/487, 488, 359/496, 497, 500, 831, 871; 428/195, 411.1, 412, 419, 473.5

(56) References Cited

U.S. PATENT DOCUMENTS 6,037,103 A * 3/2000 Hino .......................... 430/311

FOREIGN PATENT DOCUMENTS

JP 2001-033604 2/2001

OTHER PUBLICATIONS

English language translation of JP 2001–33604A, Feb. 2001.*

Encyclopedia of Polymer Science and Engineering, vol. 12; Polyimides, pp. 364–373, Oct. 1989.*

English language translation of JP 2001–033604, Feb. 2001.*

Y. Novis, et al., "Structural origin of surface morphological modifications developed on poly(ethylene terephthalate) by excimer laser photoablation," J. Appl. Phys., vol. 64, No. 1, Jul. 1, 1998, pp. 365–370.

* cited by examiner

Primary Examiner—Ramsey Zacharia
(74) Attorney, Agent, or Firm—David G. Conlin; Edwards & Angell, LLP

(57) ABSTRACT

An optical component comprising a substrate and a transparent polymer coating film laminated thereon, said polymer coating film including:

(1) a processed surface formed into a desired shape by selectively removing with a laser abrasion process;
(2) a π bond structure in the main chain of a constituting material, wherein the main chain contains an interatomic bond having bond energy smaller than photon energy of laser used for the laser abrasion process.

4 Claims, 5 Drawing Sheets

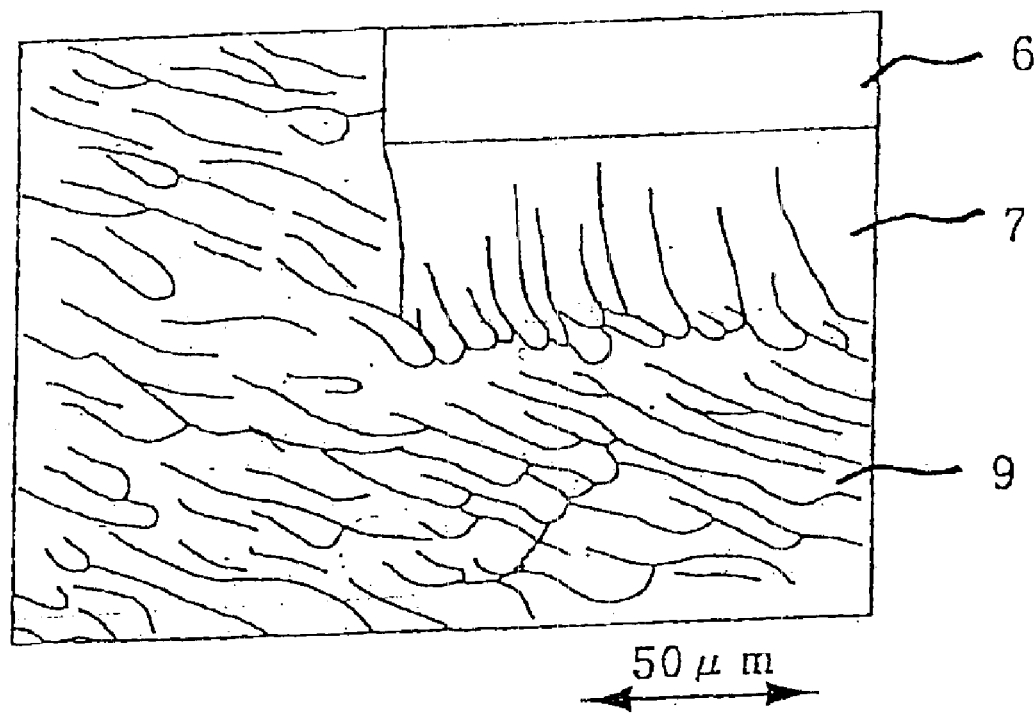
Fig. 3 (a) Prior Art
50 μm
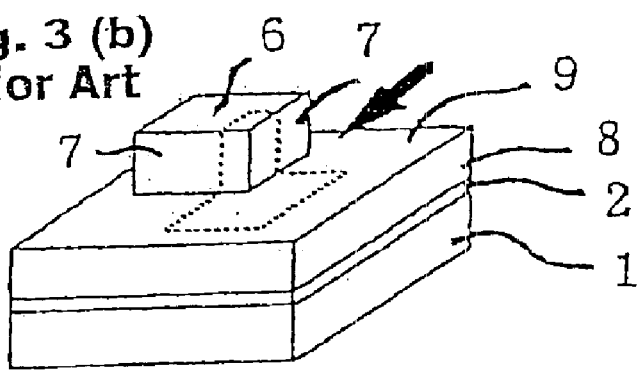
Fig. 3 (b) Prior Art

Fig. 7 Prior Art
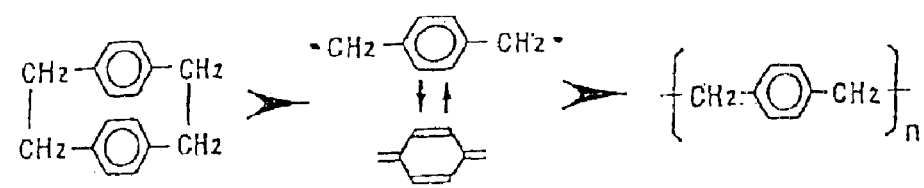
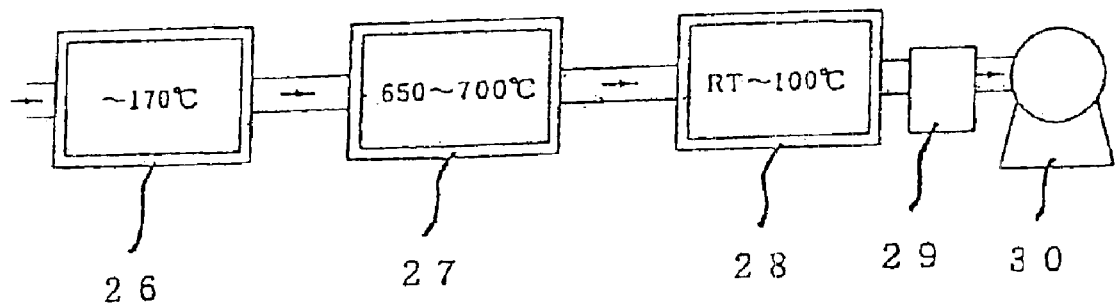

OPTICAL COMPONENT

CROSS-REFERENCE TO RELATED APPLICATION

This application is related to Japanese Patent Application No. 2001-142095 filed on May 11, 2001, whose priority is claimed under 35 USC §119, the disclosure of which is incorporated by reference in its entirety.

BACKGROUND OF THE INVENTION

1. Field of the Invention

The present invention relates to an optical component, and more particularly to a micro-structural optical component comprising a polymer coating film that is directly and monolithically formed on a substrate.

2. Description of the Prior Arts

As various portable electronic equipment and network devices have been put to practical use in recent years, development has further been demanded for a small-sized and light-weight optical device having high performance. As a main optical device, there are conventionally bulk-type optical disc devices or optical communication devices which are formed by combining various optical components such as a mirror or prism.

In these optical devices, an optical component with an mm order size manufactured by molding, cutting and polishing a glass or crystal material has been adhered and fixed in advance to the predetermined position of a substrate. However, it is difficult to downsize more the general optical component of this type from the viewpoint of its production process. Further, the process for position alignment in the assembling becomes complicated, thereby entailing a problem of poor mass production.

In order to solve the above problem, a method disclosed in Japanese Unexamined Patent Publication No. 2001-33604 has been proposed. In this method, an optical thick film comprising a polymer material and formed on a substrate is processed with a reactive ion etching or laser abrasion for directly forming a micro-structural optical component. This method has characteristics such that the processing is easy compared to the glass or crystal material as well as the position alignment of each component is unnecessary.

The above-mentioned method will be schematically explained with reference to FIG. 5. An optical device 19 is formed on a silicon substrate 15. The optical device 19 is provided with first and second optical path altering mirrors (12, 13), a polarizing separation prism 11 and photodiodes (14a, 14b) as a light receiving element. The polarizing separation prism 11 is arranged between the first and second optical path altering mirrors 12 and 13. The second optical path altering mirror 13 is arranged on the photodiodes (14a, 14b).

Incident light 16 incident from the normal direction of the substrate of the optical device 19 is refracted via the first optical path altering mirror 12, converted into light parallel to the substrate surface and directed to the polarizing separation prism 11. The polarizing separation prism 11 is composed of a material having birefringence such that the refractive index is different in polarized light (TE light) 17 having a plane of vibration parallel to the substrate and polarized light (TM light) 18 having a plane of vibration perpendicular to the substrate. When light is incident to this prism 11 with a large incident angle, the incident light 16 is divided into two polarized lights in the prism 11 since the refraction angle is different in each polarizing light. Each separated polarized light 17, 18 is refracted via the second optical path altering mirror 13, and then, directed to the respective photodiodes 14a, 14b, whereby electrical signals corresponding to the intensity of each polarized light are detected. Accordingly, the optical device 19 can be functioned as a polarized light detecting element in a pick-up device for a magneto-optic disc device.

Usable material for this polarizing separation prism 11 is, for example, some type of polyimide that shows optical anisotropy with an optical axis in the plane-normal direction only by forming a coating film (heated and sintered after coating). The polyimide coating film can be processed into a desired shape by the reactive ion etching or laser abrasion. The reactive ion etching is suitable for a processing of a large area, but the processing speed is slow such as 1 μm per minute. Compared to this, the laser abrasion utilizing photodecomposition has a characteristic of obtaining a processing speed such as 100 μm per second in the depth direction. The laser abrasion will be explained with reference to FIG. 6.

FIG. 6 shows a method for forming a tapered surface to a transparent plastic layer 21 with the laser abrasion. Excimer laser beam 23 transmitting through a laser abrasion mask 22 having a transmitting area of a rectangular shape is scaled down by a lens 24 and irradiated to a workpiece 25. When the workpiece 25 is moved in a direction shown by an arrow X with the excimer laser beam 23 irradiated thereto, the processing is performed from the right side of the workpiece 25 (the processed area is shown by a broken line). When the irradiation of the excimer laser beam 23 is stopped with the workpiece 25 moved, difference occurs in the processing amount between the right side and left side of the irradiated area since the total irradiating amount is different, to thereby form a tapered surface. A tapered surface having an optional inclined angle can be processed by adjusting the intensity of the excimer laser beam and the moving speed of the workpiece.

When the excimer laser beam is irradiated to the workpiece that is not moved, the rectangular shape of the laser abrasion mask is scaled down to be projected, so that a processed surface perpendicular to the substrate surface can be formed. The explanation of this method with reference to figures is omitted here.

On the other hand, the surface precision of the processed surface can be enhanced by newly laminating a film on the surface so as to embed the surface irregularities. In case where the surface to be processed is great, the usable method is, for example, the one in which liquid photo-curing resin is spin-coated and then cured by photo-irradiation. In case where the surface to be processed is small or where the three-dimensional shape of a μm order level is formed on the substrate, the target shape is distorted with the aforesaid embedding. Therefore, a film-formation with CVD is suitable. Particularly, the CVD formation of polyparaxylylene film does not require the high-temperature heating to the substrate (possible with room temperature), so that isotropic coating is possible for resin material having poor heat resistance (for comparison, CVD formation of a quartz requires that a portion to which a film is formed is kept at high temperature such as 400° C.).

However, some type of polymer material causes rib-like surface irregularities on the processed surface due to the aforesaid reactive ion etching process or laser abrasion process, thereby deteriorating the surface precision (smoothness) of the obtained optical component.

Further, especially in the laser abrasion process, the processed area is modified by the irradiation of the excimer laser due to a thermal reaction, thereby entailing a problem of not obtaining a smooth processed surface.

SUMMARY OF THE INVENTION

The present invention aims to provide an optical component formed by a transparent polymer coating film and having a smooth processed surface.

The present invention provides an optical component comprising a substrate and a transparent polymer coating film laminated thereon, said polymer coating film including:

(1) a processed surface formed into a desired shape by selectively removing with a laser abrasion process;

(2) a π bond structure in the main chain of a constituting material, wherein the main chain contains an interatomic bond having bond energy smaller than photon energy of laser used for the laser abrasion process.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 3(a) and 3(b) are a view showing a conventional example;

FIG. 7 is a conceptual view showing a conventional example.

DESCRIPTION OF THE PREFERRED EMBODIMENT

An optical component according to the present invention will be explained hereinafter with reference to FIGS. 1(a) to (d).

Figure 1:
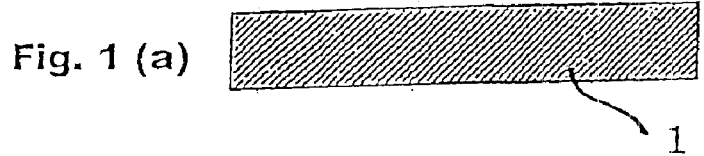
FIGS. 1(a) to 1(d) are a schematic process view showing an embodiment of the present invention.
Figure 1:
Figure 1:
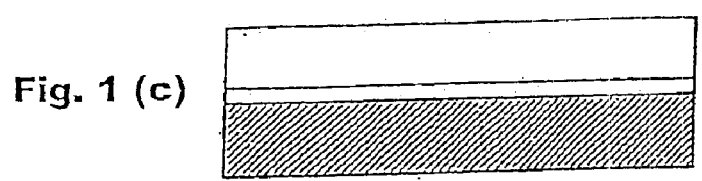
Figure 1:
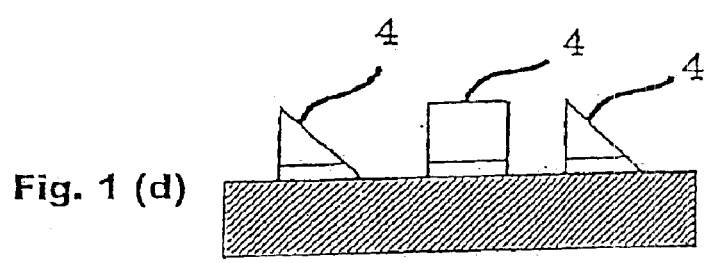

FIG. 1(a) shows a substrate 1. A material of the substrate 1 may be a glass or a semiconductor. In the case of the semiconductor substrate, a photodetector or signal processing circuit not shown can be formed. A silicon substrate was used in the present embodiment.

A transparent resin (polymer coating film) 3 can be laminated and fixed to the substrate 1 via an adhesive layer 2 as shown in FIG. 1(b). Usable material for the adhesive layer 2 include a photo-curing adhesive or thermosetting adhesive. Either one of liquid adhesive or film-type adhesive may be used for the adhesive layer 2. A thermosetting film-type adhesive 1592 manufactured by Three Bond was used in the present embodiment.

The transparent resin 3 has to be transparent to transmitting light when used as an optical component. The more important point is that a material having excellent processability in the process shown in FIG. 1(d) should be selected for the transparent resin. The point upon selecting the material will be explained in detail hereafter. A polycarbonate sheet manufactured by Mitsubishi Engineering Plastic Corp. having a thickness of 0.2 mm was used in the present embodiment. This polycarbonate sheet is formed by a melt extrusion, to which an orienting process is not performed. Polycarbonate has a transmission optical path length of 0.2 mm and a transmittance of the light having 400 nm wavelength of 80% or more, which shows that it is excellent in transparency. Further, it is excellent in heat resistance such that a glass transition point is 100° C. or more.

Subsequently, the transparent resin 3 is cut so as to match with the outer shape of the substrate as shown in FIG. 1(c).

Finally, a desired shape is formed by a laser abrasion process as shown in FIG. 1(d), to thereby obtain a microstructural optical component 4. Specifically, an optical component can be formed by irradiating a beam pattern that transmits through an abrasion mask.

Upon selecting the material for the transparent resin, a processability should be considered in addition to transparency and heat resistance. Firstly, it is not preferable to use an oriented material in order to form a smooth processed surface. Secondly, in the case of performing the laser abrasion process, the selected material is required not only to sufficiently absorb light used for the processing (i.e., to have a π bonding structure in the main chain of the structure), but also to contain in the main chain interatomic bond having bond energy smaller than photon energy of the laser used for the abrasion process. The reason for these will be explained hereinafter.

The thermosetting resin is generally subject to a melt extrusion to thereby form a film. However, an orienting process is frequently performed after the melt extrusion to some type of resin materials for improving the mechanical properties such as a pull strength, modulus of elasticity, hardness or the like or improving transparency. In particular, most materials are biaxially oriented except for a fiber or tape-like material. Popular biaxially oriented films include polyethylene terephthalate, polyethylene naphthalate, polypropylene, nylon, polyvinyl chloride, polyvinyl alcohol, polystyrene or the like.

Figure 2:
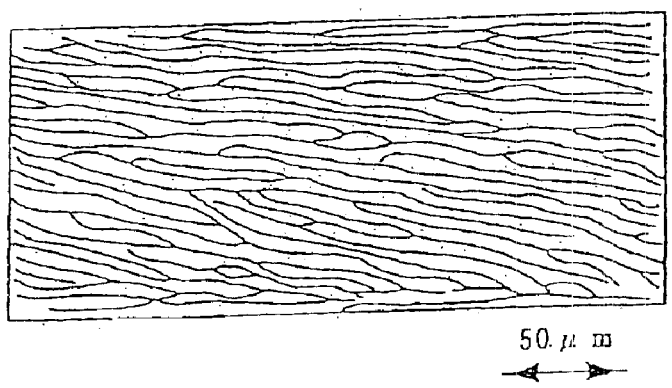
FIG. 2 is a plane view showing a conventional example.

In the case of these oriented films, a sequence of a molecular chain occurs in the film due to the orienting process. As a result, rib-like surface irregularities are produced on the etch-processed surface as shown in FIG. 2, thus unsuitable. The surface irregularities are considered to appear such that a crystal zone having satisfactory sequence of a molecular chain with a small etching rate forms mountain-like shapes, while an amorphous zone having unsatisfactory sequence of a molecular chain with a large etching rate forms valley-like shapes (see J. Appl. Phys., Vol. 64, No. 1, 1 Jul. 1988 P. 365). Further, in the crystal zone, phenyl group is oriented so as to be approximately parallel to the film surface in polyethylene terephthalate in particular, while hydrogen-bonded surface is considered to be oriented in polyvinyl alcohol or nylon.

Figure 4:
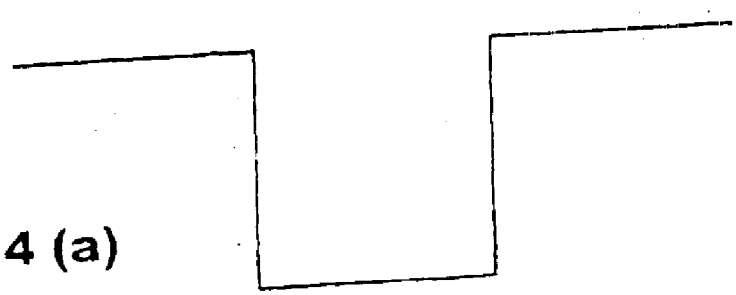
FIGS. 4(a) to 4(d) are a schematic sectional view showing a processability of a laser abrasion.
Figure 4:
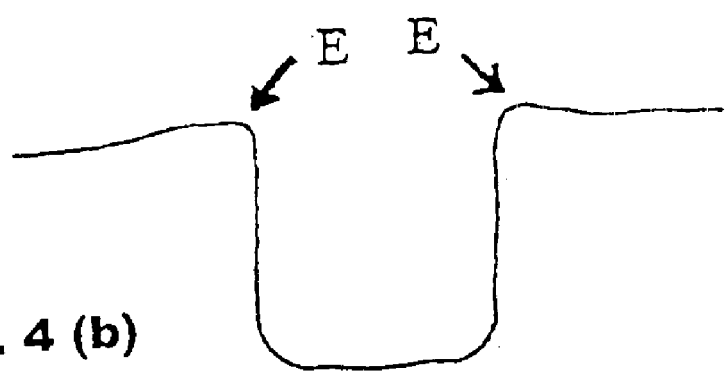
Figure 4:
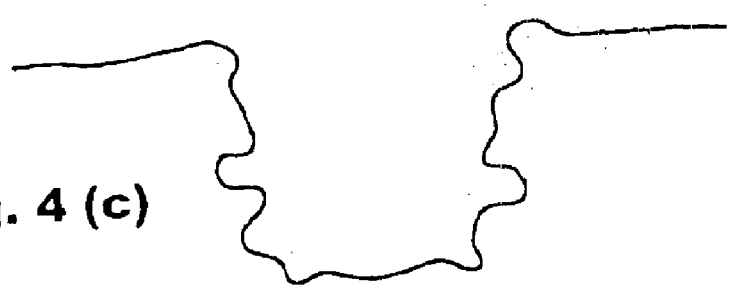
Figure 4:
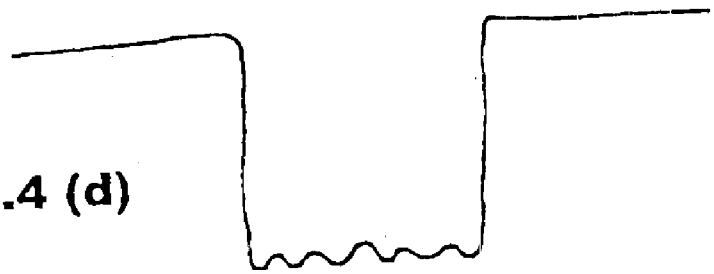
Figure 5:
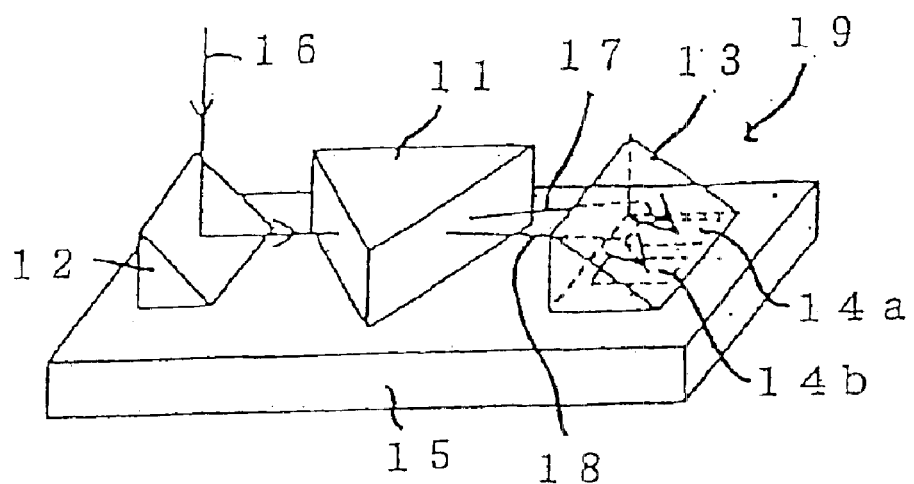
FIG. 5 is a perspective view showing a conventional example.
Figure 6:
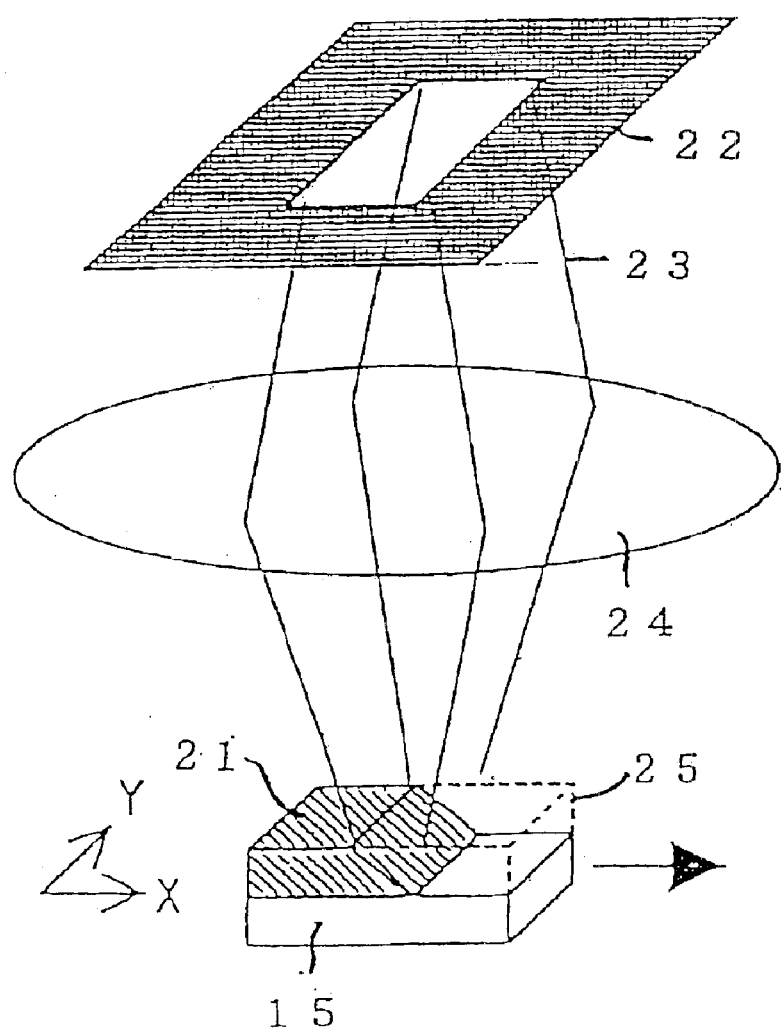
FIG. 6 is a schematic perspective view showing a process example of the present invention.

Table 1 shows the laser abrasion processability with respect to polyethylene terephthalate (hereinafter abbreviated to PET), that is a typical crystalline thermosetting resin, between the biaxially oriented one and the amorphous (non-oriented) one. Used materials in Table 1 are a biaxially oriented PET film (commercial name: Tetron) with a thickness of 188 μm manufactured by Teijin Limited and an amorphous PET sheet. Polyethylene terephthalate does not transmit ultraviolet light and contains a benzene ring in the main chain, so that the laser abrasion process proceeds but the rib-like surface irregularities shown in FIG. 2 occur on the oriented film (its sectional shape is shown in FIG. 4(d)). On the other hand, the rib-like surface irregularities do not appear on the processed surface of the non-oriented amorphous sheet. Therefore, the processed surface of the amorphous sheet is smooth, whereby P-V value and RMS value are about the half of those of the biaxially oriented film.

TABLE 1

|  | Biaxially oriented material | Amorphous material |
|---|---|---|
| Processed surface state | Rib-like surface irregularities | smooth |
| Surface precision (Laser abrasion) | | |
| (P-V) | 230 nm | 110 nm |
| (RMS) | 43 nm | 23 nm |

The rib-like surface irregularities on the biaxially oriented film occur in the case of the reactive ion etching. When the biaxially oriented PET film was processed by the reactive ion etching with 1 μm thick titanium thin film as a mask in oxygen gas atmosphere, the surface irregularities shown in FIG. 3(a) were observed.

FIG. 3(b) represents a schematic view of a sample that was processed by the reactive ion etching, while FIG. 3(a) represents an enlarged view of a portion encircled by a broken line seen from the direction shown by an arrow. As shown in FIG. 3(b), a 188 μm thick biaxially oriented PET film 8 is adhered via a 50 μm thick adhesive layer 2 onto the substrate 1, to which a dry etching is performed with a titanium mask 6 as an etching mask. The dry etching process is suspended at approximately the center of the thickness of the PET film, so that the processed surface 9 and the processed side wall 7 can be observed during the process.

As shown in FIG. 3(a), the rib-like surface irregularities occur on the processed surface 9 at a space of about 10 μm. As an extension of these irregularities, it is found that linear surface irregularities appear also on the processed side wall 7.

When the same process test was performed to Teflex (thickness: 188 μm) manufactured by Teijin Limited as a film in which molding properties of PET were improved, the rib-like surface irregularities shown in FIG. 2 also appeared. This product is a copolymer of PET in which molecular orientation is controlled for reducing the deterioration in intensity upon molding. However, this results in producing unevenness of etching rate in the film. This shows that the film material manufactured by the orientation process is unsuitable for the formation of micro-optics. Specifically, it is suitable that a film manufactured by coating—curing process or manufactured with the shape after the melt extrusion kept is adhered and fixed to the substrate.

The laser abrasion process has advantages that the processing speed is fast as well as the processing can be performed under atmospheric pressure. In order to effectively utilize the advantages of this process method, the selection of the material is important.

Firstly, the premise is that the material absorbs excimer laser light. Further, the material is required to have bond energy smaller than the energy of the absorbed light. In this case, the interatomic bond is cut at the portion where the bond energy is smaller than the energy of the irradiated light, so that the abrasion can be preceded (although two-photon reaction also occurs, its probability is small). Further, the present inventors have found out that the portion where the interatomic bond is cut is required to be contained in the main chain in the chemical structure of the material.

Table 2 shows the energy of the interatomic bond relating to the laser abrasion of the resin material. The photon energy can be obtained by Einstein's equation (E=hν h: Planck constant $6.626 \times 10^{-34}$ js, ν: light frequency). For example, in the case of KrF excimer laser light (wavelength of 248 nm), light frequency(=speed of light/wavelength of light: $2.998 \times 10^8 [m/s]/2.48 \times 10^{-7} [m]$) becomes $1.21 \times 10^{15} [s^{-1}]$, whereby the photon energy is $8.01 \times 10^{-19}$ J. Accordingly, the photon energy becomes approximately 480 kJ per 1-mol photon ($6.02 \times 10^{23}$ photons).

The irradiation of the KrF excimer laser light cuts C—C single bond from the viewpoint of energy. However, the light absorption of the material formed by the C—C single bond is actually small with respect to the excimer laser, whereby it is predicted that the abrasion is hard to proceed (actually, the transparency of polyethylene at the short wavelength area is relatively satisfactory). This is represented in Table 3 (described later). The materials having the main chain formed by the C—C single bond (four materials from the bottom of Table 3) have poor laser abrasion processability. Specifically, it is required to contain in the main chain a bond that absorbs excimer laser light and is decomposed.

Generally, the light absorption in the ultraviolet region is considered to occur by a transition of a π electron. Therefore, a structure including a π bond is contained in the main chain. Upon polymerizing a polymer material, a bond order of the produced polymer becomes small since the electrons between C and C participates in a new bond. Accordingly, a polymer material in which a triple bond or double bond remains in the main chain (limited to some type of material such as polydiacetylene) is exceptional. Typical examples of the structure having a π electron bond include a structure containing a benzene ring. A six-member ring is structurally most stabilized from the point of the electron orbit ($SP^2$ hybridized orbital) of a carbon atom. The cyclic structure in the monomer composing the polymer material is resonance-stabilized. It does not directly participate in the polymerization and kept as it is after the polymerization.

In the materials satisfying the above-mentioned conditions (those containing a benzene ring in the main chain) such as seven materials from the top of Table 3, C—H bond in the benzene ring or C—C single bond to a carbon on the main chain is detached due to the energy of the excimer laser light, to thereby decompose the structure of the benzene ring. Therefore, it is considered that the main chain of the polymer is interrupted, whereby the abrasion proceeds. The production of carbon residue is actually great in case where the abrasion satisfactorily proceeds.

Various types of isotropic transparent resin (from vinyl ester resin to cycloaliphatic acrylic resin in Table 3) having more controlled birefringence than polycarbonate conventionally used for a disc material have recently been developed. However, the main chain of these resins is formed by C—C single bond so that the production of the carbon residue is small. Therefore, the thermal reaction is predominant, whereby the laser abrasion is hard to proceed (even though the material obtained by staining a ultraviolet absorber to these materials is used, the ultraviolet absorber is only selectively decomposed, that is, it is difficult to perform the abrasion process to the resin material itself). As for the material having a benzene ring in the side chain such as polystyrene, the decomposition occurs at the side chain even though it absorbs the excimer laser light. Therefore, the abrasion process of the resin material is hard to proceed.

TABLE 2

KrF excimer laser light (248 nm): 480 kJ/mol

| Bond | Energy [kJ/mol] |
|---|---|
| C—C | 350 |
| C=C | 600 |
| C≡C | 900 |
| C∷C | 155 (Resonance energy) |
| $C_6H_5$—H | 460 |

Table 3 shows the laser abrasion processability of each typical transparent resin material. The processability is determined from the point whether a flat processed side wall can be formed or not. The processability is determined to be satisfactory (○) when the sectional shape shown in FIG. 4(a) is obtained, unsatisfactory (Δ) when modification is slightly observed at the edge portion E or surface irregularities appear as shown in FIG. 4(b), and poor (X) when a processed surface is formed in which air bubbles run away to cause a great modification at the edge portion shown in FIG. 4(c). FIG. 4(d) shows rib-like surface irregularities occurring when the oriented film is processed. The processability is determined to be poor (Δ) when such a sectional shape is obtained.

The light transparency is obtained such that the result measured by using a spectrometer UV-365 manufactured by Shimadzu Corporation is converted into a value in 200 μm thick (the reflection loss at the surface is not included so as to compare the absorption loss of the material).

TABLE 3

| transparent resin material (manufacturer) | chemical formula | manufacturing method |
|---|---|---|
| polycarbonate (Mitsubishi Kasei Co.) | (general formula, NOVAREX) | melt extrusion |
| polyether sulfone (Sumitomo Bakelite Co.) | (general formula, Sumilite FS-1300) | melt extrusion |
| Fluorinated polyimide (Hitachi Kasei Co.) | (OPI-N2005) | casting |
| polyparaxylylene (Daisan Kasei Co.) | (general formula, diX) | CVD |
| polyethyleneterephtalate (Teijin Co.) | (biaxial orientation, Tetoron) | orientation |
| polyethylenenaphtalate (Teijin Co.) | (biaxial orientation, Teonex) | orientation |

TABLE 3-continued

| transparent resin material | structure | process |
|---|---|---|
| vinyl ester resin (Shouwa Koubunshi Co.) | (general formula, RIGORITE) | thermosetting |
| alicyclic polyolefine (JSR Co.) | (ARTON) | melt extrusion |
| alicyclic acrylic resin (Hitachi Kasei Co.) | (OPTOREZ) | injection molding |
| methyl metacrylate resin (general use product) | (acryl board for material) | injection molding |
| polystyrene (general use product) | (styrol board for material) | injection molding |

| transparent resin material (manufacturer) | light transmittance (%) (transmission thickness 200 μm) | | | glass transition point (° C.) | laser abrasion processability | range of application |
|---|---|---|---|---|---|---|
| | 400 nm | 650 nm | 780 nm | | | |
| polycarbonate (Mitsubishi Kasei Co.) | 93 | 95 | 95 | 149 | ○ | optical memory (blue-red) optical transmission |
| polyether sulfone (Sumitomo Bakelite Co.) | 90 | 94 | 95 | 223 | ○(UV deteriorated) | optical memory (blue-red) optical transmission |
| Fluorinated polyimide (Hitachi Kasei Co.) | 0 | 89 | 98 | — | ○ | optical memory (red) (double refraction) optical transmission |
| poly-paraxylylene (Daisan Kasei Co.) | 73 | 94 | 97 | 80 | ○ | optical memory (red) optical transmission |
| polyethylene-terephtalate (Teijin Co.) | 88 | 94 | 95 | 78 | Δ(caused surface irregularity) | — |
| polyethylene-naphtalate (Teijin Co.) | 60 | 86 | 88 | 121 | Δ(caused surface irregularity) | — |
| vinyl ester resin (Shouwa Koubunshi Co.) | 83 | 90 | 92 | 73 | Δ(deformed) | — |
| alicyclic polyolefine (JSR Co.) | 97 | 99 | 99 | 171 | X | — |
| alicyclic acrylic resin (Hitachi Kasei Co.) | 93 | 97 | 98 | 115 | X | — |

TABLE 3-continued

| | | | | | | |
|---|---|---|---|---|---|---|
| methyl metacrylate resin (general use product) | 93 | 92 | 91 | 93 | X | — |
| polystyrene (general use product) | 99 | 99 | 99 | 100 | X | — |

The result of Table 3 shows that the processabilities of four materials from the top are excellent among the transparent resin materials. Apart from the processing test, the deterioration (changed to brown, solvent resistance was reduced) was observed in polyether sulfone due to ultraviolet irradiation. The use of ultraviolet curing adhesive is preferably avoided. Further, attention should be paid when it is applied to optical components, since the influence is worried about due to the irradiation to a short wavelength area over a long period. Polyimide fluoride is limited to be used in a long wavelength area, but it is extremely a fascinating material for its thermal stability. Vinyl ester resin satisfies the conditions from the viewpoint of its production process and chemical structure, but the modification was observed due to thermal reaction. This is considered to occur because the glass transition temperature is relatively low. The polycarbonate sheet used in the embodiment of the present invention is not oriented and includes a benzene ring structure in the main chain, to thereby be satisfactory in thermal resistance. Therefore, it is suitable for the formation of an optical component.

The use of polyparaxylylene as the polymer material composing the optical component does not cause the scattering of light since there is no difference in refractive index at the interface even though CVD coating film of the same material is laminated thereon. Accordingly, the optical characteristic (light transparency) of the obtained optical component is not deteriorated. The polyparaxylylene film can directly be vapor-deposited onto the surface of the substrate at room temperature, so that the film is not oriented. Further, it contains a benzene ring structure in its main chain, whereby the laser abrasion processability is satisfactory. Consequently, it is suitable for the formation of an optical component.

Polyparaxylylene is a resin developed by Union Carbide Chemicals & Plastics Technology Corporation, U.S. in 1965. It is crystalline and has extremely excellent corrosion resistance, heat resistance and electrical properties. Its melting point is 300 to 400° C. It is insoluble in almost all acid, alkali and solvent at room temperature.

The film-formation process of polyparaxylylene will be explained with reference to drawings.

As shown in FIG. 7, a film-forming apparatus has a vaporizing chamber 26, monomerization chamber 27 (for decomposed polymer into monomer) and vapor-deposition chamber 28. These chambers are connected in this order. The internal pressure can be reduced or replacement of inert gas can be performed by a pump 30 in the direction shown by an arrow. A trap 29 is disposed in order to trap a reaction product or unreacted residue. A paraxylylene dimer as a raw material vaporized under a reduced pressure (several Pa) in the vaporizing chamber 26 is directed to the pyrolysis chamber 27 to be decomposed into a paraxylylene monomer. The resultant is condensed on the substrate in the vaporizing chamber 28 so as to be instantaneously polymerized, to thereby form a polyparaxylylene coating film. The substrate arranged in the vaporizing chamber 28 can be heated if necessary. This process can form a polyparaxylylene coating film in a speed of, for example, several $\mu$m per hour.

According to the above-mentioned process, a monomer is uniformly diffused, different from a general resin coating. Consequently, a coating film can uniformly be adhered onto an acute angle section on the substrate, a section having a complicated shape or deep narrow hole, thereby being capable of accomplishing a coating with a thickness of several hundred $\mu$m without pinhole.

Although the polyparaxylylene coating film can directly be formed on the substrate by the above-mentioned process, an isolated film can be produced by detaching the coating film once formed on the substrate.

Although a film-like transparent resin is adhered onto the substrate with an adhesive in this embodiment, the transparent resin may directly be applied to be formed on the substrate. Usable one includes, for example, polyimide or the like that is obtained by applying polyamic acid varnish that is a precursor, and then, heating and sintering the resultant. Polyimide looks slightly brown in general, but it is transparent to red light. On the other hand, it is opaque to blue light to light of short wavelength (i.e., it absorbs light). Further, it contains a benzene ring in its main chain, so that the laser abrasion processability is satisfactory. Moreover, it is directly applied and formed on the substrate, whereby a shape after the coating and curing is kept as it is. Accordingly, rib-like surface irregularities do not occur like in an oriented film.

Resins listed in Table 3 are one of example of usable resins for the present invention. Any of the resins having a basic structure shown in Chemical formula of Table 3 can be utilized for those of the present invention. A benzene ring may include substituents such as an alkyl group, an alkoxy group, a halogen or the like as long as it does not prevent effects of the present invention. Polycarbonate is available from Nippon GE Plastics Co., Idemitsu Sekiyukagaku Co., Beyer Co., Sumitomo Dow Co. and the like except Table 3. Polyether sulfone is available from Mitsui Kagaku Co. except Table 3. Further, polyethyleneterephthalate is available from Toray Co., Mitsui Kagaku Co., Kanegafuti Kagaku Co., Nippon Ester Co., Nippon Unipet Co., Toyo Bouseki Co., Mitsubishi Engineering Plastics Co., Mitsubishi Rayon Co., Asahikasei Co., Kurare Co., Unitika Co., Kanebou Co. and the like other than Table 3.

A film as a polymer coating film manufactured by the coating—curing process, or by the melt extrusion process or manufactured such that the film having an intact isolated shape after the film-formation is adhered and fixed onto the substrate, followed by performing the etching process, to thereby form an optical component having a satisfactory surface precision (having a smooth surface) without causing rib-like surface irregularities on the processed surface.

Further, the polymer coating film is a polymer material having a $\pi$ bond structure in its main chain and including in its main chain a bond having bond energy smaller than the energy of the excimer laser beam. The polymer material has desirably a structure having a benzene ring in its main chain. This can form an optical component having a satisfactory surface precision by a laser abrasion process.

Moreover, the use of the polymer material having a benzene ring in its main chain enables the use of a material having high general-purpose property, to thereby form an optical component having a satisfactory surface precision by a laser abrasion process.

Additionally, the use of polycarbonate as the polymer material can form an optical component having a satisfactory surface precision with excellent transparency.

Further, when polyparaxylylene is used as the polymer material, scattering of light does not occur at the interface even though polyparaxylylene CVD film is laminated thereon. Therefore, the deterioration in optical properties (light transparency) of the obtained optical component can be prevented.

What is claimed is:

1. An optical component comprising:

a substrate; and a transparent polyparaxylylene coating film laminated thereon, said polyparaxylylene coating film being an optical path altering mirror or a polarizing separation prism, and said polyparaxylylene coating film including:

(1) a processed surface formed into a desired shape by selectively removing with a laser abrasion process;

(2) a π bond structure in the main chain of a constituting material, wherein the main chain contains an interatomic bond having band energy smaller than photon energy of laser used for the laser abrasion process.

2. An optical component claimed in claim 1, wherein the polyparaxylylene coating film is a non-oriented film.

3. An optical component claimed in claim 1, wherein the processed surface transmits, refracts, diffracts or reflects light of optional wavelength area.

4. An optical component claimed in claim 1, wherein the polyparaxylylene coating film is:

(a) a film directly applied and cured on the substrate or vapor-deposited on the substrate, or (b) a film formed by a melt extrusion, or (c) a film having an intact shape obtained by isolation after having been formed on another substrate and being adhered-fired onto the substrate.

* * * * *